United States Patent
Perrin et al.

(10) Patent No.: US 11,932,914 B2
(45) Date of Patent: Mar. 19, 2024

(54) PROCESS FOR MANUFACTURING A SLAG CONDITIONING AGENT FOR STEEL DESULFURIZATION

(71) Applicant: S.A. Lhoist Recherche et Developpement, Ottignies-Louvain-la-Neuve (BE)

(72) Inventors: Eric Perrin, Paris (FR); Souliyann Chunlamani, Brussels (BE)

(73) Assignee: S.A. LHOIST RECHERCHE ET DEVELOPPEMENT, Ottignies-Louvain-la-Neuve (BE)

( * ) Notice: Subject to any disclaimer, the term of this patent is extended or adjusted under 35 U.S.C. 154(b) by 278 days.

(21) Appl. No.: 17/309,680

(22) PCT Filed: Dec. 17, 2019

(86) PCT No.: PCT/EP2019/085338
§ 371 (c)(1),
(2) Date: Jun. 15, 2021

(87) PCT Pub. No.: WO2020/127039
PCT Pub. Date: Jun. 25, 2020

(65) Prior Publication Data
US 2021/0395846 A1    Dec. 23, 2021

(30) Foreign Application Priority Data
Dec. 17, 2018 (EP) .................................. 18213132

(51) Int. Cl.
*C21C 7/064* (2006.01)

(52) U.S. Cl.
CPC .................. *C21C 7/0645* (2013.01)

(58) Field of Classification Search
CPC ......... C21C 7/0645; C21C 1/025; C21C 5/36; C21C 5/54; Y02P 10/20; C21B 2400/028
USPC ............................................ 75/303
See application file for complete search history.

(56) References Cited

U.S. PATENT DOCUMENTS

| 5,397,379 A | * | 3/1995 | Barker | ................... C21C 7/064 |
|---|---|---|---|---|
| | | | | 75/319 |
| 7,811,379 B2 | | 10/2010 | Barker et al. | |

FOREIGN PATENT DOCUMENTS

| CN | 103752147 B | * | 3/2016 | |
|---|---|---|---|---|
| CN | 106148633 A | | 11/2016 | |
| EP | 2213753 A1 | * | 8/2010 | ............... C21C 5/36 |
| KR | 20170106597 A | | 9/2017 | |
| WO | WO-2016005558 A1 | * | 1/2016 | ........... A01K 1/0154 |

OTHER PUBLICATIONS

WO-2016005558-A1 Translation (Year: 2016).*
CN-103752147-B Translation (Year: 2016).*
Patent Cooperation Treaty; International Search Report on application PCT/EP2019/085338, dated Jan. 21, 2020; 2 pages.

* cited by examiner

*Primary Examiner* — Brian D Walck
*Assistant Examiner* — Danielle Carda
(74) *Attorney, Agent, or Firm* — Whitaker Chalk Swindle & Schwartz, PLLC; Charles D. Gunter, Jr.

(57) ABSTRACT

A process for manufacturing a slag conditioning agent for steel desulfurization is shown in which a dried slag material Obtained from a secondary steelmaking process is mixed with quicklime particles. The quicklime particles react with moisture in the slag material to dry the slag material and produce a blend of slag material, hydrated lime and any unreacted quicklime. The blend is then sieved to separate out the hydrated lime. The retained dried fraction after sieving is then mixed with an $Al_2O_3$ mass fraction from which the slag conditioning agent can be collected. The slag conditioning agent has an equivalent mass ratio which is between 0.55 and 1.5.

7 Claims, No Drawings

PROCESS FOR MANUFACTURING A SLAG CONDITIONING AGENT FOR STEEL DESULFURIZATION

TECHNICAL FIELD

The present invention is related to a process for manufacturing a slag conditioning agent for steel desulfurization and to said slag conditioning agent, more particularly to be used in a steel desulfurization process. The process further includes steps of valorizing by-products for agriculture applications, sintering applications or slag stabilization in steelmaking.

TECHNOLOGICAL BACKGROUND OF THE INVENTION

Steelmaking is divided in two sequential metallurgies, the primary steelmaking and the secondary steelmaking.

Primary steelmaking comprises two major industrial processes.

A first major industrial process for producing steel is the basic oxygen steelmaking process. This process comprises a first step of pelletizing iron ore to provide pellets having a certain porosity, a certain mechanical resistance and a shape allowing flowing of hot air in a blast furnace during the following step of smelting. Alternatively, the first step can be the sintering of iron ore oxides including agglomeration of carbon and minerals in order to have a targeted permeability allowing flowing of hot air in a blast furnace during the step of smelting.

In the step of smelting, coke, pelletized and/or sintered iron ore and a fluxing agent are charged into a blast furnace. Combustion of coke with hot air in the blast furnace provides carbon monoxide which reduces the iron oxide into elemental iron with emissions of carbon dioxide.

The reduced iron obtained during the smelting process has high carbon content and is also known as "pig iron". A slag containing the gangue is formed and floats over the pig iron. This slag of blast furnace is removed from the pig iron and is generally valorized for cement products.

The molten pig iron is then transferred to a converter comprising a bed of scrap and a flow of pure oxygen is introduced through a water-cooled lance in the converter to oxidize the remaining carbon and other residues present in the scrap and pig iron.

The second major industrial process in the primary metallurgy for producing steel is the electric arc furnace steelmaking. In an electric arc furnace, scrap is loaded, or direct reduced iron is charged into the furnace to produce a batch of steel by electric arc. Fluxes are also added to remove impurities.

Both first and second major industrial processes produced steel which can be used as such or can be further processed through secondary metallurgy, such as for example ladle metallurgy in order to be further purified and improved in terms of properties.

During the ladle metallurgy, there is also two main routes that are typically present, the first route is a route during which sulfur-based compounds are removed and the second route is a route where sulfur-based compound are not removed, the choice between the first and second route depending on the final properties expected in the final steel.

Calcium aluminate is commonly used in combination with quicklime and elemental aluminum for the desulphurization of steel in the secondary metallurgy, i.e. in ladle metallurgy mainly. Calcium aluminate is a metallurgical flux which achieves rapid formation of the slag.

PRIOR ART

Document WO2017/009581 discloses the state of the art of manufacturing calcium aluminate and a process for manufacturing calcium aluminate. All of these processes involve the step of mixing a source of calcium and a source of aluminum followed by a step of heating the mixture at elevated temperatures comprised between 1300 and 1700° C.

CN106148633 discloses calcium aluminate based coating agent for controlling the aluminum content in steel.

U.S. Pat. No. 7,811,379 discloses a process for manufacturing calcium aluminate product from a composition of liquid ladle slag using the latent heat released by the slag.

KR20170106597 discloses a process for the desulfurization for molten iron using a ladle slag with quicklime mixed together to replace the use of fluorite being environmental pollution material. The composition disclosed comprises 80-85 wt % of quicklime and 5-17% of aluminum-by-products and 3-15 wt % of ladle slag.

Document EP2835018 discloses a process for obtaining calcium aluminate from dry waste from the treatment of saline dross produced in the metallurgy of secondary aluminum. The dry waste has a composition comprising between 50 and 80 wt % of $Al_2O_3$, 3 to 15 wt % of $SiO_2$, 2 to 10 wt % of MgO, 0.5 to 5 wt % of CaO and below 0.4 wt % of $TiO_2$ and MnO. It is well understood by the man skilled in the art that the amounts of this list of compounds corresponds to the amounts obtained by elemental analysis and each element is expressed under his form of oxide. The dry waste is mixed with CaO and/or a CaO precursor and then heated in a furnace at temperatures above 1100° C. to obtain the calcium aluminate.

Document U.S. Pat. No. 4,490,173 discloses a steelmaking additive composition comprising from 25 to 50 wt % of lime and 75 to 50 wt % of a compound selected from the group consisting of bauxite and mixture of calcium aluminate and bauxite. The process for manufacturing this composition and the provenance of the raw materials are not mentioned. Despite it is suggested to use such a composition in a process of steelmaking, no explicit results showing substantial improvements relative to other compositions are disclosed.

U.S. Pat. No. 5,397,379 discloses a process wherein a ladle metallurgy furnace (LMF) slag is prepared for reuse in ladle addition by removing magnetically metallics in desulfurization. However, according to this document, the use of the LMF in further desulfurization seems to not be efficient enough in term of ration cost/operation There is a need for providing a metallurgical flux for a process of steel desulfurization, preferably in ladle furnace, obtainable by a cost-effective process without requiring high energy consumption nor expensive raw materials.

BRIEF SUMMARY OF THE INVENTION

The present invention is related to a process for manufacturing a slag conditioning agent for steel desulfurization. The process according to the invention comprises the steps of:
providing a slag material obtained from secondary steelmaking process, in particular a slag material obtained after Al-killing steel process, said slag material comprising at least calcium, aluminum, iron, moisture and a phase of calcium aluminate;

mixing said slag material with quicklime particles having a predetermined maximum particle size, and drying said slag material by having at least a part of the quicklime particles reacting at least partially with a moisture contained in the slag material with obtaining a first blend comprising slag material, hydrated lime and optionally unreacted quicklime, sieving said first blend at a cut-size superior or equal to said predetermined maximum particle size of said quicklime to remove a passing fraction of said first blend from a retained dried fraction of said first blend, said passing fraction having a maximum particle size lower than said cut-size and comprising a majority of said hydrated lime; and mixing said retained dried fraction with a composition having an $Al_2O_3$ mass fraction of at least 80 wt % relative to the weight of the composition, and collecting a slag conditioning agent having an equivalent mass ratio $CaO/Al_2O_3$ comprised between 0.55 and 1.5, preferably between 0.55 and 1, more preferably between 0.55 and 0.7.

The term "slag material" refers to a slag obtained from secondary steelmaking process, in particular the slag obtained after Al-killing steel process.

Indeed, whether molten steel comes from a basic oxygen furnace (BOF) or an electric arc furnace (EAF), it must be deoxidized. Deoxidation is generally performed for the purpose of reducing the dissolved oxygen content of the molten steel to the amount required by the ultimate quality of the steel product. To achieve deoxidation, specified amounts of deoxidizing agents are added to the molten steel, generally, carbon, manganese, silicon or aluminum. The deoxidizing agents can be used alone or in combination.

The slag material used in the present invention refers to a slag obtained in the secondary steelmaking where at least aluminum has been added for deoxidizing the steel, alone or in combination with other deoxidizing agents (Al-killing steel process).

The term "slag conditioning agent" refers to an agent obtained by the process according to the present invention for use in a steel desulfurization process wherein a slag is formed by addition of such slag conditioning agent, preferably in combination with quicklime and elemental aluminum for allowing the reduction of iron, with oxidation of aluminum into $Al_2O_3$ and production of calcium sulfur in the slag.

The term "a majority of said hydrated lime", within the meaning of the present invention describe the main part of hydrated lime not sticking to or not embedded within the retained dried fraction, i.e. typically as from 90 wt %, preferably as from 95 wt % or even above 98 wt %, even more than 99 wt % of said hydrated lime being produced.

The term "CaO, $Al_2O_3$, $Fe_2O_3$, . . . or more generally any metal oxide (MeO) equivalent", within the meaning of the present invention means that the semi-quantitative chemical analysis giving the relative mass fraction of calcium, aluminum and iron, . . . or even the metal Me, determined by XRF (as described in EN 15309) are reported in equivalent weight of CaO, $Al_2O_3$, $Fe_2O_3$, . . . or MeO equivalent by weight.

The terms "equivalent mass ratio $CaO/Al_2O_3$" means accordingly within the meaning of the present invention, the ratio of the equivalent in weight of CaO divided by the equivalent in weight of $Al_2O_3$.

The present invention allows to produce a slag conditioning agent based on recycled slag material from secondary steelmaking process, in particular the slag obtained after Al-killing steel process, with reduced operation costs with respect to the prior art calcium aluminate slag conditioning agent. Indeed, prior art calcium aluminate required as mentioned before a thermal treatment for having the reaction occurring between bauxite and limestone.

The present invention can be carried out on site or off site. If made on site, it is contemplated according to the present invention to have a movable plant, where series of sieves and mixers as well as the crusher are disposed and connected together and fed by specific slag material from secondary steelmaking process, in particular the slag obtained after Al-killing steel process, even more preferably from ladle furnace without specific desulfurization step. The slag conditioning agent which is produced by the movable plant is then collected and conditioned in bags or in silos for further use in a desulfurization process. The movable plant can be provided on one or more movable platform such as truck platform. In a variant, the slag material is collected on the steelmaking plant, where it has potentially already been partially processed (such as sieved and/or crushed) and transported to a treatment plant to be processed according to the present invention. Further, the collected slag conditioning agent is conditioned in bags or in silo to be further delivered back on the same steelmaking plant or to another one.

Typical slag material from secondary steelmaking process, in particular the slag obtained after Al-killing steel process comprises a ratio $CaO/Al_2O_3$ above 1.5 while commercial calcium aluminate, such as from thermal treatment of bauxite and limestone have a mean ratio $CaO/Al_2O_3$ around 1.

Slag materials obtained from secondary steelmaking process, in particular the slag comprising at least calcium, aluminum, iron, moisture and a phase of calcium aluminate obtained from Al-killing steel process generally comprises:

an amount of calcium measured by XRF (X-ray fluorescence) expressed in equivalent CaO comprised between 20 and 45 wt % relative to the weight of the slag material;

an amount of aluminum measured by XRF expressed in equivalent $Al_2O_3$ comprised between 10 and 45 wt % relative to the weight of the slag material; and an amount of iron measured by XRF expressed in equivalent $Fe_2O_3$ of at least 2 wt % relative to the weight of the slag material and wherein at least a part of said amount of calcium and at least a part of said amount of aluminum is present in said calcium aluminate phase.

Such slag materials are low cost materials. A more detailed analysis of those slag materials by XRD (X-ray diffraction) shows that they comprise various phases of compounds including calcium aluminates and calcium ferrites.

It has been surprisingly identified according to the present invention that mixing a dried recycled slag material with a composition having an $Al_2O_3$ mass fraction of at least 80 wt % relative to the weight of the composition, produces a slag conditioning agent very efficiently, without requiring thermal treatment.

The composition having an $Al_2O_3$ mass fraction of at least 80 wt %, measured by XRF, can be obtained from bauxite or preferably from recycling wastes of alumina concrete or a mix thereof. The XRF analysis (X-ray fluorescence spectrometry) is described in EN 15309.

Despite the equivalent mass ratio $CaO/Al_2O_3$ in the recycled slag material is high relative to the desired equivalent mass ratio $CaO/Al_2O_3$ in the slag conditioning agent, it was made possible according to the present invention to produce in a method wherein quicklime is added, a slag conditioning agent with similar efficiency in term of desulfurization than the commercially available calcium aluminate such as those obtained from bauxite and limestone, but less expensive and involving recycled material (also reducing costs of the operations). Indeed, according to the present invention, the step of drying the slag material with quicklime, followed by the sieving of said first blend to remove a passing fraction of said first blend from a retained dried fraction of said first blend, said passing fraction having a maximum particle size superior or equal to said predetermined maximum particle size of the quicklime and comprising a major portion of said hydrated lime, allow sufficient drying rate and dispense the use of a furnace for drying the slag material and thereby reduces the operation costs and the size of the production plant. The major amount of quicklime added for drying the slag material is removed during the said step of sieving said first blend, mainly under the form of hydrated lime.

Additional benefits of the process for manufacturing the slag conditioning agent according to the present invention is that the slag conditioning agent has advantageously a relative low melting point to provide a liquid medium in the slag wherein reactions of desulphurization are facilitated.

It has been found that the use of the slag conditioning agent obtained by the process according to the invention in combination with quicklime and reducing agents in a steel desulphurization process is as effective in term of desulfurization of steel that the use of substantially pure compounds of calcium aluminate combined with quicklime and reducing agents such as in prior art.

It is of common practice in the art of steel desulphurization to avoid flux comprising iron oxide because the presence of iron oxide requires increasing the consumption of expensive reducing agent in the process. According to the invention, the amount of iron in the slag material, measured by XRF and expressed in equivalent $Fe_2O_3$ is allowed to be up to 20 wt %.

Above this value of 20 wt %, the slag conditioning agent thereby obtained would have to be utilized in the steel desulphurization process with too much reducing agent and it wouldn't be economically worth. In the slag material, some of the iron is present under the form of calcium ferrites which are beneficial for the fluidizing the slag in the steel desulfurization process.

Preferably, the XRD analysis of the slag material shows significant presence of calcium aluminate, preferably at least 5 wt % in weight of the slag material. The slag material comprises an amount of calcium "Ca" expressed in CaO equivalent comprised between 20 and 45 wt % measured by XRF analysis and an amount of Al expressed in $Al_2O_3$ equivalent comprised between 10 and 45 wt % measured by XRF analysis and wherein the equivalent mass ratio $CaO/Al_2O_3$ is superior or equal to 1 (typical of the slags obtained by the process Al killing process). The weight % are mentioned relative to the weight of the slag material.

It is important that the slag material does not contain or contain the less possible amount of sulfur, titanium oxide or boron, preferably under 1 wt %, more preferably under 0.5 wt % more preferably under 0.2 wt % in weight of the slag material, for the avoiding any detrimental effect on the mechanical or rheological properties of steel.

In an embodiment of the process for manufacturing the slag conditioning agent according to the invention, when the slag material comprises an amount of iron below 5 wt % relative to the weight of the slag material, measured by XRF analysis, the targeted equivalent mass ratio of $CaO/Al_2O_3$ is preferably comprised between 0.55 and 0.9, preferably between 0.55 and 0.7, more preferably between 0.57 and 0.63.

As it is known by the phase diagram of calcium aluminate, the lowest melting point of in this phase diagram is reached when the equivalent mass ratio $CaO/Al_2O_3$ is comprised between 0.9 and 1.1.

During the desulfurization process, quicklime, elemental aluminum and the slag conditioning agent are introduced in the hot metal, resulting in reduction of iron with production of $Al_2O_3$ and CaS. Because of the production of $Al_2O_3$ during the desulfurization process, there is an advantage to provide a slag conditioning agent having an equivalent mass ratio $CaO/Al_2O_3$ which is slightly higher than 0.5, preferably comprised between 0.55 and 0.9, preferably between 0.55 and 0.7, more preferably between 0.57 and 0.63 so that the production of $Al_2O_3$ in combination with the use of quicklime during the desulphurization process decreases the equivalent mass ratio $CaO/Al_2O_3$ in the slag to 0.9 to 1.1 corresponding to the lowest melting point of the phase diagram of calcium aluminates and such that the slag in the process of desulfurization presents a low viscosity facilitating the contact between the different components for the reactions of desulfurization.

In another embodiment of the process for manufacturing the slag conditioning agent according to the invention, when the slag material comprises an amount of iron comprised between 5 to 20 wt % relative to the weight of the slag material, in which a substantial amount of iron is present under the form of calcium ferrites, the targeted equivalent mass ratio of $CaO/Al_2O_3$ can be higher than 0.7, preferably lower than 1.5, more preferably lower than 1.4, more preferably lower than 1.

The amount of calcium ferrite measured by XRD analysis is preferably of at least 1 wt %, preferably at least 2 wt %, more preferably at least 3 wt %, in particular more than 4 wt %, and more particularly more than 5 wt %, relative to the weight of the slag material.

The calcium ferrites present in the slag material and therefore in the slag conditioning agent obtained by the process according to the invention, have a relatively low melting point, about 1350° C. Therefore, the calcium ferrites present in the slag conditioning agent participate to the fluidization of the slag during the desulphurization process.

The targeted equivalent mass ratio $CaO/Al_2O_3$ in the slag conditioning agent can be increased in function of the amount of calcium ferrites, and therefore the amount of composition having an $Al_2O_3$ mass ratio measured by XRF and relative to the weight of the composition, to be mixed with said dried slag material, can be reduced.

Preferably, the moisture content of the slag material is inferior to 10 wt %, preferably less than 5 wt %, more preferably less than 3 wt % relative to the weight of the slag material. The less moisture in the slag material, the less quicklime has to be used to dry the slag material.

According to the present invention, the moisture content is measured by loss on drying (LOD) at 105° C.

In a preferred embodiment of the invention, the process according to the invention aims to provide a slag conditioning agent with a predetermined granulometry having:

a predetermined minimum particle size (a) such as to avoid dispersion of fines during manipulation of the product and/or;

a predetermined maximum particle size (b) optimized for the pneumatic transport conditions or for the mechanical transport conditions at the steel plant.

The particle size distribution of the slag conditioning agent or any other of particles involved in the process according to the present invention is easily determined by sieving particles on a sieve having a certain mesh allowing or not the passage of at least 90%, preferably at least 95%, even 98 or 99 wt % of the said particles.

The slag material has generally a broad particle size distribution and has to be crushed to obtain particles of slag material having a maximum particle size (b) corresponding to the maximum predetermined maximum particle size (b) wished for the slag conditioning agent.

Preferably, a first sieving step is performed to remove a first fraction of particles that couldn't be crushed under the predetermined maximum particle size (b). Then a second sieving step is performed to remove the fraction under the predetermined minimum size (a) wished for the slag conditioning agent. The passing fraction is valorized for agriculture applications or sintering applications (steel industry).

The fraction of the crushed slag material having a particle size distribution (a-b) in the range comprised between the minimum (a) and maximum (b) particle size is retained and dried by mixing with quicklime having a particle size distribution inferior to the minimum particle size (a). Preferably, the quicklime used for drying said fraction of crushed slag material (a-b) is a high reactive quicklime having a time of reactivity $t_{60}$ with water inferior to 2 min, as measured according to the water reactivity test of European standard EN459-2:2010E.

More preferably, the said quicklime has a BET specific surface area superior to 0.8 $m^2/g$, measured by nitrogen adsorption manometry after vacuum degassing at 190° C. for at least 2 hours, calculated by the multiple-point BET method as described in standard ISO 9277:2010 E.

In any case, the particle size distribution of the quicklime must be lower than the predetermined minimum size (a) wished for the slag conditioning agent. Preferably, the particle size distribution of said quicklime is inferior to 1 mm, more preferably inferior to 500 μm, more preferably inferior to 200 μm and even more particularly inferior to 90 μm.

The particle size distribution of said quicklime means that more than 90 wt % of the particles have a particle size inferior to 1 mm, more preferably inferior to 500 μm, more preferably inferior to 200 μm and even more particularly inferior to 90 μm, measured by sieving analysis.

It is advantageous to provide a quicklime having particles with a high reactivity characterized by the said $t_{60}$, a small particle size distribution and optionally also a high specific surface area such as to remove efficiently the moisture from the crushed slag material with the less amount as possible of quicklime and such that the so-formed hydrated lime from quicklime can be easily removed in the subsequent step of sieving. In that subsequent step of sieving, the blend comprising crushed slag material and hydrated lime is sieved to discard a passing fraction of particles having a particle size inferior to the minimum particle size (a) wished for the slag conditioning agent.

In a variant, quicklime has particles of lime kiln dust, showing also efficiency for removing the moisture of the crushed slag material with an amount such that so formed hydrated lime can be easily removed in the subsequent step of sieving. In that subsequent step of sieving, the blend comprising crushed slag material and hydrated limekiln dust is sieved to discard a passing fraction of particles having a particle size inferior to the minimum particle size (a) wished for the slag conditioning agent.

By the terms "lime kiln dust", it is meant according to the present invention a lime co-byproduct from quicklime manufacturing which contain typically at least 50 wt % of quicklime particles, preferably 60 wt % of quicklime particles, more preferably at least 70 wt % relative to the weight of the lime kiln dust. The lime kiln dust can contain calcium carbonate residues from unburned limestone and/or partial re-carbonation of lime and other impurities from the limestone, notably silica. Typically, a small amount of hydrated lime can be found in the lime kiln dust, such as less than 8 wt %, relative to the weight of the lime kiln dust. Typically, lime kiln dust has an average medium particle size $d_{50}$ lower than 60 μm, preferably lower than 50 μm, more preferably lower than 40 μm.

The discarded fraction comprises high amounts of hydrated lime and some further elements coming from the slag material. That discarded fraction is valorized for applications in sintering. The retained dried (coarse) fraction comprises mainly particles of slag material having a desired range of particle size (a-b) and a minor amount of hydrated lime, preferably inferior to 1%. The retained fraction is mixed with a composition having an $Al_2O_3$ mass fraction of at least 80 wt % and having the same desired range of particle size (a-b), to obtain as a final product, a slag conditioning agent having a desired range of particle size (a-b) and a targeted equivalent mass ratio $CaO/Al_2O_3$.

Exemplary values of particles size (a) are comprised between 0.5 mm and 5 mm, preferably between 1 mm and 4 mm and can be for example 1 mm, 2 mm or even 3 mm.

The maximum particle size of quicklime shall be chosen independently of the cut-size of the sieving but should respect the condition that maximum particle size of quicklime is lower than or equal to the cut-size of the sieving.

Exemplary values of particles size (b) are comprised between 10 mm and 25 mm, preferably between 12 mm and 20 mm and can be for example 12 mm, 14 mm or even 15 mm.

In an embodiment of the invention, the first step of sieving before addition of quicklime can be suppressed, but in this case, more quicklime must be used for drying the slag material which represents an additional cost for drying slag particles that have to be discarded thereafter.

Other embodiments of the process according to the present invention are mentioned in the appended claims.

The present invention also relates to a slag conditioning agent, in particular for a process of steel desulfurization, such as in ladle steelmaking, comprising phases of calcium aluminate and having an equivalent mass ratio $CaO/Al_2O_3$ comprised between 0.55 and 1.5, preferably between 0.55 and 1, more preferably between 0.55 and 0.7, said slag conditioning agent having an iron content measured by XRF and expressed in equivalent $Fe_2O_3$ of at least 2 wt %, preferably at least 3 wt %, and at most 20 wt %, relative to the weight of the slag conditioning agent and an aluminum content expressed in equivalent $Al_2O_3$ of at least 30 wt %, more preferably of at least 40 wt %.

In an advantageous embodiment, the slag conditioning agent comprise an amount of calcium ferrites measured by XRD of at least 1 wt %, more preferably at least 2 wt %, more preferably at least 5 wt % relative to the weight of the slag conditioning agent.

According to the present invention, said slag conditioning agent has a particle size distribution comprised between a minimum value and a maximum value, said minimum value being of at least 1 mm.

According to a variant of the present invention, said slag conditioning agent has a particle size distribution comprised between a minimum value and a maximum value, said maximum value being of maximum 20 mm.

Other embodiment of the slag conditioning agent according to the present invention are mentioned in the appended claims.

The present invention also relates to a use of a slag conditioning agent according to the present invention, for example obtained by the process according to the present invention in a process of steel desulfurization.

Preferably, the slag conditioning agent according to the present invention is used at an amount of 2 to 16 kg, preferably from 2.5 to 12 kg, more preferably from 3 to 10 kg, even more preferably below 8 kg and more particularly less than 6 kg of slag conditioning agent/ton of steel preferably in combination with elemental aluminum in amounts less than 100 g/t of steel, preferably less than 80 g/t, more preferably less than 70 g/t, more preferably less than 60 g/t of steel, more particularly less than 50 g/t and even more preferably less than 40 g/t steel and an amount of quicklime of less than 12 kg/t steel, preferably less than 10 kg/t steel and even more preferably less than 8 kg/t steel.

Other use of the slag conditioning agent is mentioned in the appended claims.

Other characteristics and advantages of the present invention will be derived from the non-limitative following description, and by making reference to the drawings and the examples.

DETAILED DESCRIPTION OF THE INVENTION

Examples—

An example of a process for manufacturing a slag conditioning agent according to the present invention is described herein.

25.2 ton of a slag obtained from secondary steelmaking process, in particular the slag obtained after Al-killing steel process, is crushed to obtain slag particles under 14 mm. After the step of crushing, a first sieving can be performed for removing the coarse particles that couldn't be crushed under 14 mm and those coarse particles can be re-injected in the crusher used for a further crushing in another production batch. 4 t of crushed slag particles are discarded. Then a second step of sieving is performed on the 21.2 t of crushed slag material particles to remove the fraction of crushed slag particles below 3 mm. 5.2 t of crushed slag particles under 3 mm are discarded and valorized for slag conditioning in steelmaking applications (passing fraction).

The elemental composition of the fraction (retained fraction) of slag material having a particle size in the range comprised between 3 and 14 mm is measured by XRF on samples dried at 105° C. This fraction comprises 24.6 wt % of Aluminum expressed in equivalent $Al_2O_3$, 41 wt % of calcium expressed in equivalent CaO, 16 wt % of iron expressed under equivalent $Fe_2O_3$, 5.5 wt % of magnesium expressed in equivalent MgO, 3 wt % of manganese expressed in $Mn_2O_3$, 7.1 wt % of silicon expressed in equivalent $SiO_2$ and other impurities.

This fraction has a loss on drying (LOD) at 105° C. of 1.84%, corresponding to the moisture of the fraction and a loss on ignition (LOI) at 900° C. of 3.3 wt % which may correspond to the loss of hydroxides and/or carbonates in the phases present in the fraction. XRD analysis shows various phases of compounds including calcium aluminates and calcium ferrites.

16 t of the fraction of slag particles between 3 and 14 mm is then dried by mixing with 1.6 t of high reactive quicklime having a particle size under 1 mm, a BET specific surface area superior to 0.8 $m^2/g$ and a reactivity $t_{60}$ with water below 1 minute. The blend of slag particles and hydrated lime thereby obtained is sieved to remove the passing fraction of particles under 3 mm of particle size.

About 1.8 t of particles under 3 mm particle size is discarded. This latter fraction of discarded particles is valorized in applications of agriculture, sintering and slag conditions for steelmaking.

The elemental composition of the retained fraction at 3 mm (15.8 ton) of the blend of slag particles with quicklime having a particle size in the range comprised between 3 and 14 mm is measured by XRF on samples dried at 105° C. This fraction comprises 20.7 wt % of Aluminum expressed in equivalent $Al_2O_3$, 46.1 wt % of calcium expressed in equivalent CaO, 15.6 wt % of iron expressed under equivalent $Fe_2O_3$, 6.4 wt % of magnesium expressed in equivalent MgO, 2.7 wt % of manganese expressed in $Mn_2O_3$, 6.4 wt % of silicon expressed in equivalent $SiO_2$ and other impurities. This fraction has a loss on drying (LOD) at 105° C. inferior to the level of detection which means that the fraction is well dried and a loss on ignition (LOI) at 900° C. of 4.58 wt % which may correspond to the loss of hydroxides and/or carbonates in the phases present in the fraction or in the added quicklime.

The same analyses are performed on the fraction of the blend of slag particles mixed with quicklime having a particle size below 3 mm. A sample of this fraction comprises 7.5 wt % of Aluminum expressed in equivalent $Al_2O_3$, 70.4 wt % of calcium expressed in equivalent CaO, 6.9 wt % of iron expressed under equivalent $Fe_2O_3$, 6.2 wt % of magnesium expressed in equivalent MgO, 0.9 wt % of manganese expressed in $Mn_2O_3$, 6.4 wt % of silicon expressed in equivalent $SiO_2$ and other impurities. This fraction has a loss on drying (LOD) at 105° C. of 0.07% and a loss on ignition (LOI) at 900° C. of 24 wt % which to correspond to the loss of water molecules from hydrated lime. These measurements show that the moisture has been well removed.

15.8 t of the fraction of the blend of slag particles with quicklime having a particle size in the range comprised between 3 and 14 mm is then mixed with 6.8 t of an alumina composition previously sieved to the same range of particle size between 3 and 14 mm, to obtain the slag conditioning agent according to the invention. The XRF analysis of the alumina composition shows that it comprises 86 wt % of aluminum expressed in equivalent $Al_2O_3$, 5.3 wt % of magnesium expressed in equivalent MgO, 5.5 wt % of silicon expressed in $SiO_2$ equivalent, 2 wt % of zirconium expressed in $ZrO_2$ equivalent, and other impurities.

The final elemental composition of the slag conditioning agent is measured by XRF analysis and contains 42.9 wt % of aluminum expressed in equivalent $Al_2O_3$, 28.9 wt % of calcium expressed in equivalent CaO, 12.8 wt % of iron expressed under equivalent $Fe_2O_3$, 4.1 wt % of magnesium expressed in equivalent MgO, 2.2 wt % of manganese expressed in equivalent $Mn_2O_3$, 7.2 wt % of silicon expressed in equivalent $SiO_2$ and other impurities. The equivalent mass ratio $CaO/Al_2O_3$ is of 0.67. XRD analysis still shows various phases of compounds including calcium aluminates and calcium ferrites in less amounts than in the slag material because of the dilution effect with the alumina composition.

In a steel desulfurization process, the slag conditioning agent obtained according to the process of the present invention is used in an amount of 3 to 5 kg/t of steel, in combination with elemental aluminum in amounts of 600 steel and a determined amount of quicklime such as 10 kg/t steel. This steel desulfurization process is compared with a typical process wherein substantially pure calcium aluminate with an equivalent mass ratio $CaO/Al_2O_3$ of 0.5 is used in an amount of 5 kg/t of steel in combination with elemental aluminum in amounts of 40 g/t of steel and a determined amount of quicklime 10 kg/t steel.

Both processes show the same efficiency in term of desulfurization. Despite the steel desulfurization process using the slag conditioning agent obtained according to the invention requires slightly more elemental aluminum for reducing iron, the additional price of elemental aluminum is compensated by the cost-effective price of the slag conditioning agent compared to the price of substantially pure calcium aluminate.

Additional benefits of the process for manufacturing the slag conditioning agent according to the present invention is that slag material from secondary steelmaking process, in particular the slag obtained after Al-killing steel process, can be recycled. Also, some of the by-products obtained during the process can be valorized in other applications. In the process according to the invention, the step of drying the slag material with quicklime followed by the removal of hydrated lime dispense the use of a furnace for drying the slag material and thereby reduces the operation costs and the size of the production plant.

It should be understood that the present invention is not limited to the described embodiments and that variations can be applied without going outside of the scope of the appended claims.

The invention claimed is:

1. Process for manufacturing a slag conditioning agent for steel desulfurization comprising the steps of:
    providing a slag material obtained from secondary steelmaking process, in particular a slag material obtained after an Al-killing steel process, said slag material comprising at least calcium, aluminum, iron, moisture, and a phase of calcium aluminate;
    mixing said slag material with quicklime particles having a predetermined maximum particle size, and drying said slag material by having at least a pan of the quicklime particles reacting at least partially with a moisture contained in the slag material thereby obtaining a first blend comprising slag material, hydrated lime and optionally unreacted quicklime,
    sieving said first blend at a cut-size superior or equal to said predetermined minimum particle size of said quicklime to remove a passing fraction of said first blend from a retained dried fraction of said first blend, said passing fraction having a maximum particle size lower than said cut-size and comprising a majority of said hydrated time; and
    mixing said retained dried fraction with a composition having an $A_2O_3$ mass fraction of at least 80 wt % relative to the weight of the composition, and collecting a slag conditioning agent having an equivalent mass ratio $CaO/Al_2O_3$ comprised between 0.55 and 1.5.

2. Process according to claim 1 wherein the said slag material comprising at least calcium, aluminum iron, moisture, and a phase of calcium dominate comprises:
    an amount of calcium measured by X-ray fluorescence expressed in equivalent CaO comprised between 20 and 45 wt % relative to the weight of the slag material;
    an amount of aluminum measured by XRF expressed in equivalent $Al_2O_3$ comprised between 10 and 45 wt % relative to the weight of the slag material; and
    an amount of iron measured by XRF expressed in equivalent $Fe_2O_3$ of at least 2 wt % relative to the weight of the slag material,
    and wherein at least a part of said amount of calcium and at least a part of said amount of aluminum is present in said calcium aluminate phase.

3. Process according to claim 1, wherein the said slag material comprises up to 20 wt % of iron expressed in equivalent $Fe_2O_3$ relative to the weight of the slag material.

4. Process according to claim 1, wherein the moisture of said slag material is present at a moisture content less than 10 wt % relative to the weight of the slag material.

5. Process according to claim 1, wherein the said quicklime particles comprises at least particles having a reactivity with water to according to the EN 459-2:2010E, less than 2 min.

6. Process according to claim 1, wherein the said quicklime particles comprises at least lime kiln dust particles.

7. Process according to claim 1, wherein the said quicklime particles have a BET specific surface area Water than 0.8 $m^2/g$ measured hy nitrogen adsorption manometry after vacuum degassing at 190° C. for at least 2 hours, calculated by the multiple-point BET method as described in standard ISO 9277:2010 E.

* * * * *